United States Patent
Lucas et al.

(10) Patent No.: US 12,049,855 B1
(45) Date of Patent: Jul. 30, 2024

(54) METHOD AND APPARATUS FOR REDUCING CONSEQUENCES OF A BULKHEAD FAILURE FOR A LIQUID METHANE AND LIQUID OXYGEN ROCKET

(71) Applicants: Victoria Arel Lucas, Rancho Cascades, CA (US); Howard Keith Henson, Rancho Cascades, CA (US)

(72) Inventors: Victoria Arel Lucas, Rancho Cascades, CA (US); Howard Keith Henson, Rancho Cascades, CA (US)

( * ) Notice: Subject to any disclaimer, the term of this patent is extended or adjusted under 35 U.S.C. 154(b) by 0 days.

(21) Appl. No.: 18/639,030

(22) Filed: Apr. 18, 2024

Related U.S. Application Data

(60) Provisional application No. 63/577,894, filed on May 27, 2023.

(51) Int. Cl.
*F02K 9/60* (2006.01)
*B64G 1/40* (2006.01)
*F02K 9/42* (2006.01)

(52) U.S. Cl.
CPC .............. *F02K 9/425* (2013.01); *B64G 1/402* (2013.01); *F02K 9/605* (2013.01)

(58) Field of Classification Search
CPC . B64G 1/402; F02K 9/42; F02K 9/425; F02K 9/605
See application file for complete search history.

(56) References Cited

U.S. PATENT DOCUMENTS

| | | | | |
|---|---|---|---|---|
| 3,097,766 | A * | 7/1963 | Biehl | F02K 9/605 |
| | | | | 222/394 |
| 5,018,634 | A * | 5/1991 | Le Touche | F17C 13/001 |
| | | | | 220/4.15 |
| 5,085,343 | A * | 2/1992 | Scarr | B64G 1/402 |
| | | | | 220/636 |
| 5,582,001 | A * | 12/1996 | Bradford | F02K 9/72 |
| | | | | 60/211 |
| 5,862,670 | A | 1/1999 | Lak | |
| 5,961,074 | A | 10/1999 | Dunn | |
| 6,101,808 | A | 8/2000 | Knuth | |
| 11,708,804 | B2 | 7/2023 | Bulk | |
| 11,846,254 | B2 | 12/2023 | Chen | |
| 2003/0089434 | A1 | 5/2003 | Flynn | |
| 2009/0061267 | A1 | 3/2009 | Monzyk | |
| 2010/0218482 | A1 | 9/2010 | Greason | |
| 2010/0326097 | A1 | 12/2010 | Nguyen | |
| 2014/0117021 | A1* | 5/2014 | Quemerais | B64G 1/402 |
| | | | | 220/560.12 |
| 2017/0254296 | A1 | 9/2017 | Weldon | |
| 2018/0058378 | A1 | 3/2018 | Roz | |

* cited by examiner

*Primary Examiner* — Kyle Robert Thomas
(74) *Attorney, Agent, or Firm* — Egbert, McDaniel & Swartz, PLLC

(57) ABSTRACT

A method and apparatus for reducing consequences of a bulkhead failure for a liquid methane and liquefied oxygen rocket in which the rocket has a body, an oxygen tank positioned in the body, a fuel tank positioned in the body, at least one rocket engine positioned adjacent an end of the body, a bulkhead formed in the body between the oxygen tank and the fuel tank, and a container having triethylaluminum therein. The rocket engine is adapted to mix oxygen from the oxygen tank with fuel from the fuel tank. The container of triethylaluminum is positioned between the bulkhead and the fuel tank. The fuel tank will contain liquefied natural gas therein. The oxygen tank contains liquid oxygen.

16 Claims, 1 Drawing Sheet

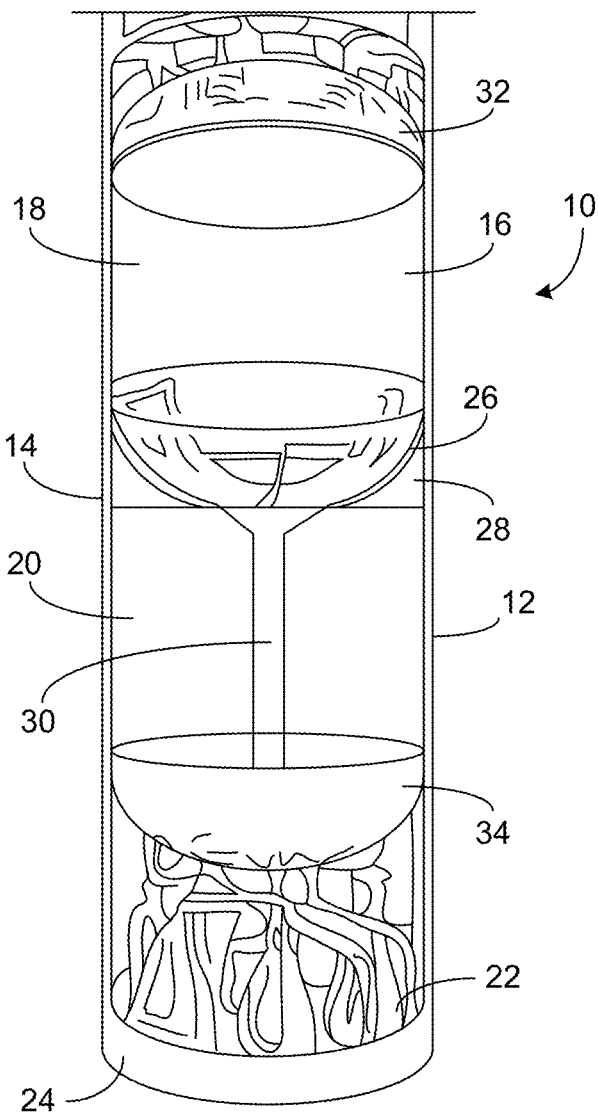

METHOD AND APPARATUS FOR REDUCING CONSEQUENCES OF A BULKHEAD FAILURE FOR A LIQUID METHANE AND LIQUID OXYGEN ROCKET

CROSS-REFERENCE TO RELATED APPLICATIONS

The present application claims priority from U.S. Patent Application No. 63/577,894, filed on May 27, 2023.

BACKGROUND OF THE INVENTION

The present invention relates to liquid methane and liquid oxygen powered rockets. More particularly, the present invention relates to methods and apparatus for avoiding explosions occurring as a result of the mixing of liquid methane and liquid oxygen.

In the last decade, liquid natural gas (LNG) has become the rocket fuel of choice. There are several reasons for this. Liquefied natural gas has a slightly higher specific impulse (i.e. the number of seconds a unit of fuel produces a unit of thrust). Liquefied natural gas avoids any coking problems associated with carbon deposits in the engines. The liquefied natural gas rocket has temperature compatibility with liquefied oxygen. It also has a relatively low costs. Liquid methane has a low specific impulse than liquid hydrogen, but it is it is easier to store due to its higher boiling point and density, as well as its lack of hydrogen embrittlement. It also leaves less residue in the engines compared to kerosene. As such, it is particularly adapted for reusability.

In NASA's Mars Design Reference Mission 5.0 documents, liquid methane/liquid oxygen (methalox) was the chosen propellant mixture for the lander module. Due to the advantage methane fuel offers, liquid methane is likely to be the fuel for future launch projects. Liquid methane has been used on rockets that have reached orbit. For example, the Zhuque-2 successfully reached orbit on its second flight on Jul. 12, 2023. This was the first methane-fueled rocket to do so. The Vulcan Centaur successfully reached orbit on its first try in January 2024. The liquid methane/liquid oxygen mixture was part of the second stage of the rocket.

Three U.S. government agencies are undertaking studies to examine the safety issues associated with a new generation of launch vehicles that use liquid oxygen and methane propellants. In a May 15 meeting of the Federal Aviation Administration's Commercial Space Transportation Advisory Group, FAA officials described efforts that are underway to understand the explosive effects of that propellant combination in the event of a launch accident. It was viewed that the liquid methane/liquid oxygen combination as the fuel source provided a superior fuel for the propulsion of rockets. However, there was great concern can about the yield of the explosive combination. In particular, the mixture of both liquid oxygen and methane increases the explosive potential of the fuel. For example, the 3400 tons of fuel in the Space XIX heavy booster would have a blast potential of around 6800 tons of TNT. This is approximately half of the 15 kT yield of the Hiroshima bomb. As such, the FAA is running tests at the Dugway proving ground to determine the potential for liquid natural gas and liquid oxygen as fuel sources for launch vehicles.

There are a large number of advantages of using methane (liquefied natural gas) over some currently-used rocket fuels. Liquid hydrogen, for example, which is used as a fuel by the Space Shuttle and many other contemporary launch systems, must be stored in the temperature of −252.9 C. This is only about 200 above absolute zero. Liquid methane, on the other hand, can be stored at the much higher and more convenient temperature of −161.6 C. As a result, methane fuel tanks do not require as much insulation. This makes them lighter and cheaper to launch. The tanks can also be smaller because liquid methane is denser than liquid hydrogen. Once again, this saves money and weight.

Methane is also relatively safe for use on human missions. While some rocket fuels are potentially toxic, methane is classified as a green propellant that can be handled without the use of a hazmat suit. The potentially biggest advantage of using methane is that this material occurs abundantly and could be manufactured on many worlds that future spacecraft will visit. On Mars, for example, methane could be made by the Sabathier process. This involves mixing carbon dioxide with hydrogen and then heating the mixture to produce methane and water. The Martian atmosphere is an abundant source of carbon dioxide. The relatively small amount of hydrogen required for the process could be brought along from earth or gathered in situ from the Martian ice.

Further out in the solar system, methane becomes much easier to come by. On Saturn's moon Titan, methane literally falls from the sky. Titan is dotted with lakes and rivers of methane and other hydrocarbons that could one day serve as fuel depots. A methane-powered rocket could allow a robotic probe to land on the surface of Titan, gather geological samples, refill its tanks, and blastoff to return the samples to the earth. As such, a need as developed in order to build an LOX/LNG rocket in which the risks associated with an explosion from the mixture of the LOX and LNG is avoided.

In the past, various patents have issued relating to the provision of fuel for rocket engines, along with the use of certain propellants for such rocket engines. For example, U.S. Pat. No. 5,862,670, issued on Jan. 26, 1999 to T. I. Lak, describes a cryogenic upper stage for a reusable launch vehicle. This patent notes that the leakage of propellants, such as oxygen and hydrogen, in an enclosed environment in the atmosphere can lead to fires or explosions. For storage tanks on reusable launch vehicles, such as the Space Shuttle, where the propellant is to be stored in the cargo bay of the vehicle, the storage tank should be filled while the vehicle is at a safe altitude in order to avoid the dangers associated with propellant leakage. The process of this patent describes launching the vehicle with an inert gas in the storage tanks, dumping the inert gas and filling the tanks in the cargo bay from the main propellant tanks during the launch once the vehicle is at a safe altitude. The propellant is dumped overboard in its storage tanks filled with an inert gas if the vehicle needs to make an emergency landing.

U.S. Pat. No. 5,961,074, issued on Oct. 5, 1999 to B. P. Dunn, describes a method and system for delivering pressurized propellants to a rocket engine. One of the propellants is at least partially vaporized and the vapor is in pressure communicating relationship with other propellants on-board the rocket-propelled vehicle. This vapor pressure pressurizes the propellants to a significant degree that they can be charged directly to the rocket engine, or the pressure may be boosted through pumps, if required. The propellant reservoirs are contained in a single housing.

U.S. Pat. No. 6,101,808, issued on Aug. 15, 2002 Knuth et al., teaches a cryogenic solid hybrid rocket engine and method of propelling the rocket. The cryogenic solid hybrid engine has a solid propellant chamber, a first propellant within the chamber in which the first propellant is in a solid form and is in fluid form at room temperature, and a coolant fluid chamber in which the coolant fluid in the coolant fluid chamber is maintained at a temperature below the freezing point of the first propellant.

U.S. Pat. No. 11,708,804, issued on Jul. 25, 2023 to Bulk et al., provides a staged combustion liquid rocket engine with a pre-burner and turbopump unit integrated into the structure of the combustion chamber. An initial propellant mixture is combusted in the preburner combustion chamber formed as an annulus around a main combustion chamber. The combustion products from the preburner drive the turbine of the preburner and turbo pump unit and subsequently are injected into the main combustion chamber for secondary combustion along with additional propellants. This generates thrust through a supersonic nozzle.

U.S. Pat. No. 11,846,254, issued on Dec. 15, 2023 to Y. S. Chen, shows an integrated propulsion system for hybrid rockets. This integrated propulsion system includes an oxidizer tank, a rocket engine, a pressurization device, an oxidizer pipe, and a valve unit. The rocket engine is disposed within the oxidizer tank and partially located on a first side of the oxidizer tank. The pressurization device is disposed, at least in part, within the oxidizer tank and is located on a second side of the oxidizer tank opposite the first side of the oxidizer tank. The pressurization device is configured to regulate an overall pressure level within the oxidizer tank. The oxidizer pipe and valve unit are connected to the oxidizer tank and the rocket engine and configured to control feeding of an oxidizer from the oxidizer tank into the rocket engine.

U.S. Patent Application Publication No. 2003/0089434, published on May 15, 2003 to Flynn et al., teaches a method and apparatus for the preparation and usage of a cryogenic propellant. In particular, this describes a method and apparatus for remotely forming a mixture of liquid oxygen and liquid methane such that the liquid oxygen and liquefied natural gas never contact each other inside the container in which the mixture is to be used. The method disallows contact between the liquefied oxygen and the liquefied methane in order to prevent the pre-mixture or inadvertent explosive combustion that can occur in a variety of ways.

U.S. Patent Application Publication No. 2009/0061267, published on Mar. 5, 2009 to Monzyk et al., provides a power device and oxygen generator for oxygen, hydrogen and carbon mass regeneration and recycling for breathing and fuel/energy generation purposes. This combines and integrates a photoelectrolytically-powered electrochemical and gas handling system with one or more fuel cells.

U.S. Patent Application Publication No. 2010/0218482, published on Sep. 2, 2010 to Granson et al., describes a system and method for cooling rocket engines. The system includes a propellant tank fluidically coupled to the rocket engine to hold a pressurized propellant, a coolant tank to hold a coolant, a first heat exchanger thermally coupled to the rocket engine and fluidly coupled to the coolant tank, a second heat exchanger thermally coupled to the propellant tank and fluidically coupled to the first heat exchanger, and third heat exchanger disposed inside the propellant tank to thermally couple a propellant withdrawn from the tank for combustion to a propellant disposed inside the tank. The coolant flows from the coolant tank to the first heat exchanger into the first heat exchanger to cool the rocket engine. The propellant withdrawn from the propellant tank receives heat from the propellant disposed inside the tank through the third heat exchanger to convert to a gaseous propellant when withdrawn from the propellant tank as a liquid propellant.

U.S. Patent Application Publication No. 2010/0326097, published on Dec. 30, 2010 to Nguyen et al., describes a method for densifying liquid methane. The method includes passing the liquid methane through a liquid nitrogen bath, self-pressurizing a container associated with the liquid nitrogen bath to boil off the liquid nitrogen within the container, and regulating pressure within the liquid nitrogen container to maintain a boiling point of the liquid nitrogen above the triple point temperature of the liquid methane passing through the liquid nitrogen bath.

U.S. Patent Application Publication No. 2017/0254296, published on Sep. 7, 2017 to Weldon et al., provides a rocket engine bipropellant supply system. Water is first pumped from a water tank to a rocket nozzle cooling heat exchanger wherein it is evaporated into a superheated steam. A generator supplies electricity to an electrolyzer that electrolyzers superheated steam into gaseous hydrogen and gaseous oxygen. The gaseous hydrogen and gaseous oxygen is employed for forming an annular curtain of secondary combustion in a divergent rocket engine. The secondary combustion gas surrounds a central thrust of combustion gas produced in an upstream combustion chamber by primary injection of hydrogen/oxygen supplied from a liquid hydrogen tank and a liquid oxygen tank. The liquid hydrogen tank and liquid oxygen tank are pressurized by gaseous hydrogen and gaseous oxygen generated by the electrolyzer.

U.S. Patent Application Publication No. 2018/0058378, published on Mar. 1, 2018 to Roz et al., teaches a pressurization device for a liquid-oxygen tank of a rocket engine. The tank is pressurized by injecting gaseous nitrogen into the tank after filling the tank with liquid oxygen but prior to causing the engine to operate. When the engine is in operation, liquid oxygen is taken off. The taken-off oxygen is heated so as to obtain gaseous oxygen. The gaseous oxygen is injected into the gas blanket of the tank. The pre-pressurization nitrogen forms a nitrogen buffer between the liquid oxygen present in the gaseous oxygen tank injected into the gas blanket.

It is an object of the present invention to provide a method and apparatus that reduces consequences of a bulkhead failure for a liquid methane and liquid oxygen rocket.

It is another object of the present invention to provide a method and apparatus that starts a fire instead of an explosion.

It is another object of the present invention to provide a method and apparatus that prevents liquefied natural gas and liquefied oxygen from mixing.

It is another object of the present invention to provide a method and apparatus that serves to prevent the loss of life in spaceflight.

It is another object of the present invention to provide a method and apparatus that minimizes or eliminates explosions.

It is still a further object to the present invention to provide a method and apparatus that is relatively inexpensive to incorporate into existing liquid methane and liquid oxygen rockets.

These and other objects and advantages of the present invention will become apparent from a reading of the attached specification and appended claims.

SUMMARY OF THE INVENTION

The present invention is a method and apparatus for reducing consequences of the bulkhead failure for a liquid methane and liquid oxygen rocket. The rocket comprises a body, an oxygen tank positioned in the body, a fuel tank positioned in the body, at least one rocket engine positioned adjacent an end of the body, a bulkhead formed in the body between the oxygen tank and the fuel tank, and a container having triethylaluminum therein. The rocket engine is adapted to mix oxygen from the oxygen tank with the fuel from the fuel tank. The container of triethylaluminum is positioned between the bulkhead and the fuel tank.

In the preferred embodiment of the present invention, the fuel tank contains liquefied natural gas therein. The oxygen tank contains liquid oxygen. A pipe extends from the oxygen tank either through the fuel tank or exterior of the fuel tank so as to connect with the rocket engine. A common dome separates the oxygen tank from the fuel tank. The container of triethylaluminum is positioned around an exterior of the common dome. The rocket engine includes a plurality of rocket engines each receiving a mixture of the liquid oxygen and the liquefied natural gas from the respective oxygen tank and the fuel tank.

The present invention is also a method of reducing consequences of a failure of a rocket. The rocket will have an oxygen tank and a fuel tank therein. The oxygen tank has liquid oxygen therein. The fuel tank has liquefied natural gas therein. A bulkhead is formed between the oxygen tank and the fuel tank. The method includes positioning a container of triethylaluminum adjacent the bulkhead in a location between the oxygen tank and the fuel tank. This method further includes adding a quantity of triethylaluminum to the container. This quantity of triethylaluminum is added to the container prior to adding the liquefied oxygen to the oxygen tank and adding the liquefied natural gas to the fuel tank. Alternatively, the method of the present invention includes the steps of adding the liquefied oxygen to the oxygen tank, adding the liquefied natural gas to the fuel tank, and adding the quality of triethylaluminum to the container subsequent to at least one of the steps of adding liquefied oxygen and adding liquefied natural gas. In this method, a pipe extends from the oxygen tank to the rocket engine. A pipe extends through the container of triethylaluminum to the rocket engine. The triethylaluminum reacts with the liquid oxygen if the liquid oxygen leaks from the oxygen tank. In particular, the step of reacting occurs when the liquid oxygen leaks through the bulkhead. The triethylaluminum is ignited in the container so as to cause a fire to occur prior to the liquefied oxygen reacting with the natural liquefied natural gas in the fuel container.

The present invention is also an improvement in a rocket in which the rocket has a body with a liquefied oxygen tank and a liquefied natural gas tank therein. The liquefied oxygen from the liquefied oxygen tank and the liquefied natural gas from the liquefied natural gas tank are mixed prior to ignition in the engine of a rocket. This improvement in the present invention comprises a supply of triethylaluminum positioned between the liquefied oxygen tank and the liquefied natural gas tank. In particular, a container receives the supply of the triethylaluminum therein. A bulkhead is formed between the liquefied oxygen tank and the liquefied natural gas tank. The container is positioned at one side of the bulkhead. In the preferred embodiment of the present invention, the side of the bulkhead is on the side opposite the liquefied oxygen tank. The bulkhead includes a common dome formed between the liquid oxygen tank and liquified natural gas tank. The supply of triethylaluminum is positioned against the surface of the common dome. A pipe extends from the liquid oxygen tank through an interior of the liquefied natural gas tank. The pipe extends through the common dome. The pipe is connected or interconnected to the rocket engine such that the liquid oxygen from the liquid oxygen tank flows through the pipe to the engine.

The object of the present invention is to prevent the mixing of liquefied natural gas and liquid oxygen. The invention includes an open container of triethylaluminum in the top of the liquefied natural gas tank. This triethylaluminum ignites on contact with oxygen (even at cryogenic temperatures). The liquefied oxygen leak into the liquefied natural gas tank will result in a fire, but no explosion.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

BRIEF DESCRIPTION OF DRAWINGS

FIG. 1 is a cross-sectional view showing the construction of the apparatus of the present invention.

DETAILED DESCRIPTION OF THE INVENTION

FIG. 1 shows the rocket 10 as having a body 12 with an outer wall 14. The outer wall 14 of the rocket 12 has a generally cylindrical configuration. An interior volume 16 is formed within the body 12. In particular, an oxygen tank 18 is positioned in the body. A fuel tank 20 is also positioned in the body 12. At least one rocket engine 22 is positioned adjacent an end 24 of the body 12. This rocket engine 12 is adapted to mix oxygen from the oxygen tank 18 and the fuel from the fuel tank 12. A bulkhead 26 is formed in the body 12 between the oxygen tank 18 and the fuel tank 20. A container 28 is located in the interior volume 16 of the body 12. Container 28 contains triethylaluminum therein. This container 28 is positioned between the bulkhead 26 and the fuel tank 20.

In the present invention, the fuel tank 20 contains liquefied natural gas therein. The oxygen tank 18 contains liquid oxygen therein. A pipe 30 is illustrated as extending from the oxygen tank 18 so as to connect with the rocket engine 22. Pipe 30 is illustrated in FIG. 1 as extending through the interior of the fuel tank 20. In particular, pipe 30 is connected to a bottom of the bulkhead 26 so as to have one end communicating with the liquid oxygen in the oxygen tank 18. The pipe 30 serves to isolate the oxygen from the liquid oxygen from the oxygen tank 18 form the liquefied natural gas in the fuel tank 20. Ultimately, the opposite end of pipe 30 will connect with the rocket engine 20 such that a mixture of the liquefied natural gas in the fuel tank 20 and the liquid oxygen from the oxygen tank 18 can occur in a manifold of the rocket engine 22.

Importantly, FIG. 1 shows the pipe 30 as extending through the interior of the fuel tank 20. In order to further prevent the possibility of an explosion between the liquid methane and the liquid oxygen, the pipe 30 could be formed to the exterior of the wall 14 of the body 12 or formed on an exterior of the fuel tank 12. The configuration in which the pipe 30 extends to the interior of the fuel tank 20 simply enhances the aerodynamics associated with the rocket 10 of the present invention.

FIG. 1 shows that the bulkhead 26 is a common dome that separates the oxygen tank 18 from the fuel tank 20. The container 28 of triethylaluminum is positioned adjacent and around an exterior of the common dome of the bulkhead 26.

The oxygen tank 18 is located above the common dome of the bulkhead 26. Another dome 32 is further positioned within the interior of the body 12 of the rocket 10 so as to define the oxygen tank. The oxygen tank 18 can be capable of holding 860 tons of liquefied oxygen. However, the quantity of liquid oxygen in the oxygen tank 18 can vary largely dependent upon the requirements of the rocket 10. The fuel tank 12 is defined by the area between the surface of the common dome of the bulkhead 26 and another dome 34. Dome 34 separates the fuel tank 20 from the rocket engine 22. The fuel tank 20 is configured, in a preferred embodiment, to hold 240 tons of liquefied natural gas. The rocket engine 22 includes a plurality of rocket engines each receiving a mixture of the liquefied oxygen from the oxygen tank 18 and the liquefied natural gas from the fuel tank 20. Ultimately, the rocket engines 22 will produce thrust that extends outwardly of the bottom 24 of the body 12.

The use of the container 28 of triethylaluminum serves to prevent explosions in the present invention. If any oxygen from the oxygen tank 18 should leak through the common dome of the bulkhead 26, it ignites the triethylaluminum. This causes a fire rather than to create an explosive mix. This ignition can occur even at cryogenic temperatures. The use of the triethylaluminum effectively avoids any explosions that might occur to the rocket 10.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

The invention claimed is:

1. A rocket comprising:
   a body having a wall;
   an oxygen tank positioned in said body;
   a fuel tank positioned in said body;
   at least one rocket engine positioned adjacent to an end of said body, said at least one rocket engine adapted to mix oxygen from the oxygen tank with the fuel from the fuel tank;
   a bulkhead formed in said body between said oxygen tank and said fuel tank; and
   a container having triethylaluminum therein, said container positioned within the wall of the body between said bulkhead and said fuel tank.

2. The rocket of claim 1, said fuel tank containing liquefied natural gas therein, said oxygen tank containing liquid oxygen.

3. The rocket of claim 2, further comprising:
   a pipe extending from said oxygen tank so as to connect with said at least one rocket engine.

4. The rocket of claim 3, wherein said pipe extends through an interior of said fuel tank.

5. The rocket of claim 2, said at least one rocket engine comprising a plurality of rockets each receiving a mixture of the liquid oxygen and the liquefied natural gas from the respective oxygen tank and the fuel tank.

6. The rocket of claim 1, said bulkhead comprising:
   a common dome separating said oxygen tank from said fuel tank, said container being positioned around an exterior of said common dome.

7. A method of reducing consequences of failure for a rocket, the rocket having an oxygen tank and a fuel tank therein, the oxygen tank having a liquefied oxygen therein, the fuel tank having a liquefied natural gas therein, a bulkhead being formed between the oxygen tank and the fuel tank, the method comprising:
   positioning a container of triethylaluminum adjacent the bulkhead in a location between the oxygen tank and the fuel tank.

8. The method of claim 7, further comprising:
   adding a quantity of triethylaluminum to the container.

9. The method of claim 8, the step of adding comprising:
   adding the quantity of triethylaluminum to the container prior to adding the liquefied oxygen to the oxygen tank and adding the liquefied natural gas to the fuel tank.

10. The method of claim 8, further comprising:
    adding the liquefied oxygen to the oxygen tank;
    adding the liquefied natural gas to the fuel tank; and
    adding the quantity of triethylaluminum to the container subsequent to at least one of the steps of adding the liquefied oxygen and adding the liquefied natural gas.

11. The method of claim 7, further comprising:
    reacting the triethylaluminum with the liquefied oxygen if the liquefied oxygen leaks from the oxygen tank.

12. The method of claim 11, wherein the step of reacting occurs when the liquefied oxygen leaks through the bulkhead into the container of triethylaluminum.

13. The method of claim 12, further comprising:
    igniting the triethylaluminum in the container so as to cause fire to occur prior to the liquefied oxygen reacting in the liquefied natural gas in the fuel tank.

14. An improvement in a rocket, wherein the rocket has a body with a liquefied oxygen tank and a liquefied natural gas tank therein in which the liquefied oxygen from the liquefied oxygen tank and the liquefied natural gas from liquefied natural gas tank flows so as to be mixed prior to ignition in an engine of the rocket, the improvement comprising:
    a supply of triethylaluminum position between the liquefied oxygen tank and the liquefied natural gas tank.

15. The improvement of claim 14, the bulkhead comprising a common dome formed between the liquefied oxygen tank and the liquefied natural gas tank, the supply of triethylaluminum positioned against a surface of the common dome.

16. The improvement of claim 15, further comprising:
    a pipe extending from the liquefied oxygen tank through an interior of the liquefied natural gas tank, the pipe extending through the common dome, said pipe connected to or interconnected to the engine such that the liquefied oxygen from the liquefied oxygen tank passes through said pipe to the engine.

* * * * *